(12) United States Patent
Nicodemus et al.

(10) Patent No.: US 10,730,556 B2
(45) Date of Patent: Aug. 4, 2020

(54) AUTOMATED VALET PARKING METHOD AND DEVICE

(71) Applicant: Robert Bosch GmbH, Stuttgart (DE)

(72) Inventors: Rolf Nicodemus, Bietigheim-Bissingen (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 215 days.

(21) Appl. No.: 15/564,662

(22) PCT Filed: Apr. 13, 2016

(86) PCT No.: PCT/EP2016/058050
§ 371 (c)(1),
(2) Date: Oct. 5, 2017

(87) PCT Pub. No.: WO2016/173836
PCT Pub. Date: Nov. 3, 2016

(65) Prior Publication Data
US 2018/0072345 A1    Mar. 15, 2018

(30) Foreign Application Priority Data
Apr. 30, 2016    (DE) .................. 10 2015 208 068

(51) Int. Cl.
*B62D 15/02*    (2006.01)
*G05D 1/00*    (2006.01)
*B60W 30/06*    (2006.01)
*G08G 1/16*    (2006.01)

(52) U.S. Cl.
CPC ......... *B62D 15/0285* (2013.01); *B60W 30/06* (2013.01); *G05D 1/0088* (2013.01); *G08G 1/168* (2013.01); *G05D 2201/0213* (2013.01)

(58) Field of Classification Search
CPC . B62D 15/0285; B60W 30/06; G05D 1/0088; G05D 2201/0213; G08G 1/168
See application file for complete search history.

(56) References Cited

U.S. PATENT DOCUMENTS

2004/0233036 A1    11/2004    Sefton
2010/0156672 A1    6/2010    Yoo et al.
(Continued)

FOREIGN PATENT DOCUMENTS

DE    102008027692 A1    12/2009
DE    102011118551 A1    5/2013
(Continued)

OTHER PUBLICATIONS

International Search Report dated Jun. 30, 2016, of the corresponding International Application PCT/EP2016/058050 filed Apr. 13, 2016.

*Primary Examiner* — Brian P Sweeney
(74) *Attorney, Agent, or Firm* — Norton Rose Fulbright US LLP; Gerard Messina

(57) ABSTRACT

A method for controlling an automated parking operation in which a motor vehicle is controlled autonomously on a route between a drop zone and a parking space includes steps of detecting that a person is on board the motor vehicle during an autonomous driving process, determining that permission does not exist for transporting the person on the trip, and carrying out one or more actions.

9 Claims, 2 Drawing Sheets

(56) References Cited

U.S. PATENT DOCUMENTS

| | | | | |
|---|---|---|---|---|
| 2012/0044046 A1* | 2/2012 | Al-Jafar | ............... | E01F 13/085 340/5.2 |
| 2012/0188100 A1 | 7/2012 | Min et al. | | |
| 2015/0233719 A1* | 8/2015 | Cudak | ................... | G01C 21/26 701/23 |
| 2015/0353080 A1* | 12/2015 | Mukaiyama | ............ | E05B 77/54 701/23 |

FOREIGN PATENT DOCUMENTS

| | | |
|---|---|---|
| DE | 102012222562 A1 | 6/2014 |
| DE | 102013200493 A1 | 7/2014 |
| FR | 2815921 A1 | 5/2002 |
| JP | 2007219738 A | 8/2007 |
| WO | 2006039830 A1 | 4/2006 |

* cited by examiner

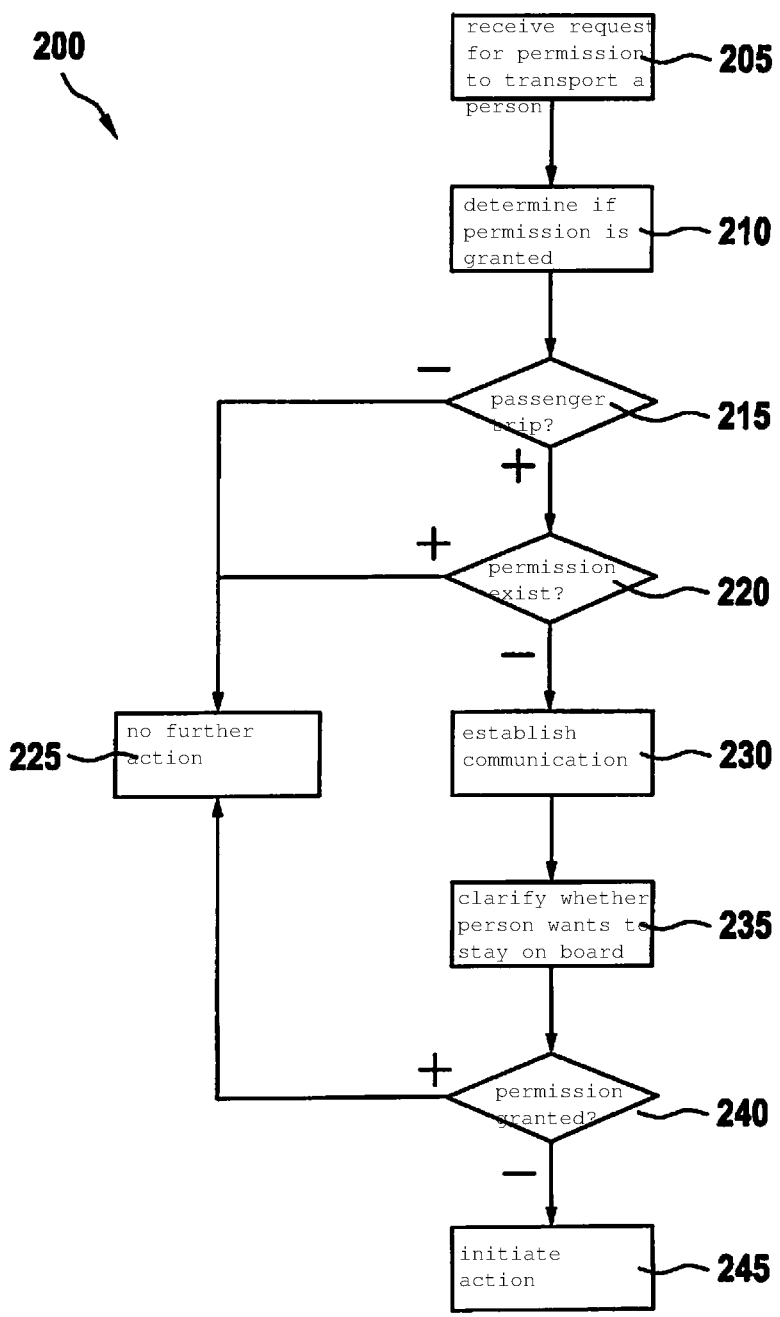

AUTOMATED VALET PARKING METHOD AND DEVICE

FIELD

The present invention relates to a technology for controlling an autonomously operating motor vehicle.

BACKGROUND INFORMATION

German Patent Application No. DE 10 2012 222 562 A1 describes a system for managed parking areas for transferring a motor vehicle from a start position to a destination position.

In so-called Automated Valet Parking (AVP), a motor vehicle is parked by its driver at a drop zone, for example in front of a parking facility, from where it drives autonomously to a parking position or, on the reverse path, from the parking position to the drop zone. If there are still persons in the motor vehicle during the autonomous controlling of the motor vehicle, this can cause problems. For example, the persons could leave the motor vehicle during the parking process, which could disrupt the operation of the parking facility. In particular, such persons can interfere with an autonomous valet parking operation.

On the other hand, it can be desirable to allow a person to be on board the autonomously moving motor vehicle, for example for reasons of system monitoring, or because an autonomously controlled motor vehicle has broken down and must be removed from a traffic area.

SUMMARY

The present invention is based on the object of providing a technology for improved controlling of a motor vehicle during autonomous driving in the context of an automated valet parking. The present invention may achieve this object. Preferred specific embodiments are described herein.

According to one aspect, a method for controlling an automated parking operation, in which a motor vehicle is autonomously controlled on a route between a drop zone and a parking space, includes steps of detecting that a person is on board the motor vehicle during an autonomous driving operation, determining that permission for transporting the person on the trip does not exist, and carrying out one or more actions.

In a further aspect, a device for controlling an automated parking operation in which a motor vehicle is controlled autonomously on a route between a drop zone and a parking space includes a monitoring device for checking whether there is a person in the passenger compartment of the motor vehicle, a determining device for determining that permission does not exist for transporting the person on the trip, and a control device for controlling one or more actions.

According to a further aspect, a computer program product includes program code means for carrying out the method as recited in one of the preceding claims if the computer program product is executed on a processing device or is stored on a computer-readable data carrier.

The present invention is based on the idea that the transport of a person on board an autonomously operating motor vehicle in the context of an automated parking operation does not necessarily represent a circumstance that cannot be tolerated. Rather, in accordance with the present invention, the reaction to this process situation is as flexible as possible. In particular, the present invention may permit, upon query or request, the transport of the person on board the motor vehicle.

For this purpose, a request for granting permission may be detected already prior to the driving process. For example, the request can be made by a person on board the motor vehicle using a smartphone and a corresponding data connection to a control device for the parking operation. The method steps indicated above are applied only if the request is rejected.

A further specific embodiment may also allow for the permission to be requested at a later time. In particular, once it has been detected that a person is on board the motor vehicle, a communication connection to the person in the motor vehicle can be established, for example via a loudspeaker mounted inside or outside the motor vehicle, a telephone connection, or a data connection to the motor vehicle itself or to a device of the person, such as a smartphone. The person then has the opportunity to submit a request for the granting of permission at this later time. The transportation of the person is unauthorized only if this permission is denied, and one of the actions indicated above can be performed.

In both variants of the receiving of a request for permission, the request can be rejected only when a traffic situation in the area of the parking operation is classified as dangerous. For example, if another motor vehicle is travelling in the vicinity of the motor vehicle with the person, this can already be classified as dangerous. A high overall traffic volume in the area of the parking operation can also be considered dangerous. If there is no danger, the person can be allowed to ride along. In a further variant, it can also be ensured that the traffic situation is not dangerous before the request is granted. In addition, it is also for example possible to wait until an autonomous driving process of another motor vehicle has been completed.

Different actions are possible, which can also be combined with each other. For example, a control destination of the motor vehicle can be modified. For this purpose, the motor vehicle can be instructed to stop. In another specific embodiment, the motor vehicle can be diverted to another parking space, where, for example, it is safely possible to get out of the vehicle. In this way, the motor vehicle can also be taken out of the automated parking operation. In still another specific embodiment, an infrastructure component that controls a travel route of the motor vehicle, such as a traffic light, barrier, or dynamic traffic guide, can be controlled to block the path of the motor vehicle and/or to divert it to the other parking space described above.

A warning notice can also be outputted if it has been determined that the person is being transported during autonomous operation of the motor vehicle. The warning notice can be directed in particular to a person on board the motor vehicle and can for example be outputted by an infrastructure element such as a sign, a warning light, or a blinking light, or a loudspeaker announcement. The warning signal can also be outputted by a means of communication on board the motor vehicle, such as a hands-free system or a smartphone of the person. The warning notice can be used to inform the person that he or she is not permitted to ride along, or that such riding along is undesirable. This holds in particular when the person intervenes in the automatic controlling of the motor vehicle or is driving the motor vehicle himself/herself. The warning can be given in the form of a concrete instruction for action, for example to stop the motor vehicle.

In a further specific embodiment, personnel in the area of the automated parking operation can be instructed to clarify the situation. For this purpose, such personnel can be requested to visit the motor vehicle in person and, if warranted, to check the personal data of the person and/or to escort the person away from the area of the automated parking operation. In yet another specific embodiment, the warning can be outputted to the person in the motor vehicle, for example via an on-board information component, a mobile device such as a smartphone, or one of the mentioned infrastructure elements.

In still another variant, the action can be used to modify a control destination of another motor vehicle in the area of the parking operation. The specified route can also be modified thereby. In this way, the motor vehicle can be moved into a safe position or can be moved out of an area where AVP motor vehicles may be driving. In a variant, the entire traffic flow can be rescheduled so that, for example, all other motor vehicles driving within a specified radius around the motor vehicle, or in the overall parking system, are stopped or diverted.

If permission does not exist, the motor vehicle can also be controlled to stop. This can be done by intervening directly in the controlling of the motor vehicle, for example by sending a corresponding instruction to the motor vehicle. The route can be modified or blocked by an infrastructure component that controls the driving route. Such a component can include, for example, a barrier, a traffic light, or a similar device.

The present invention is now described in more detail with reference to the Figures.

BRIEF DESCRIPTION OF THE DRAWINGS

FIG. 2 shows a flow diagram of a method for controlling the parking system of FIG. 1.

DETAILED DESCRIPTION OF EXAMPLE EMBODIMENTS

Figure 1:
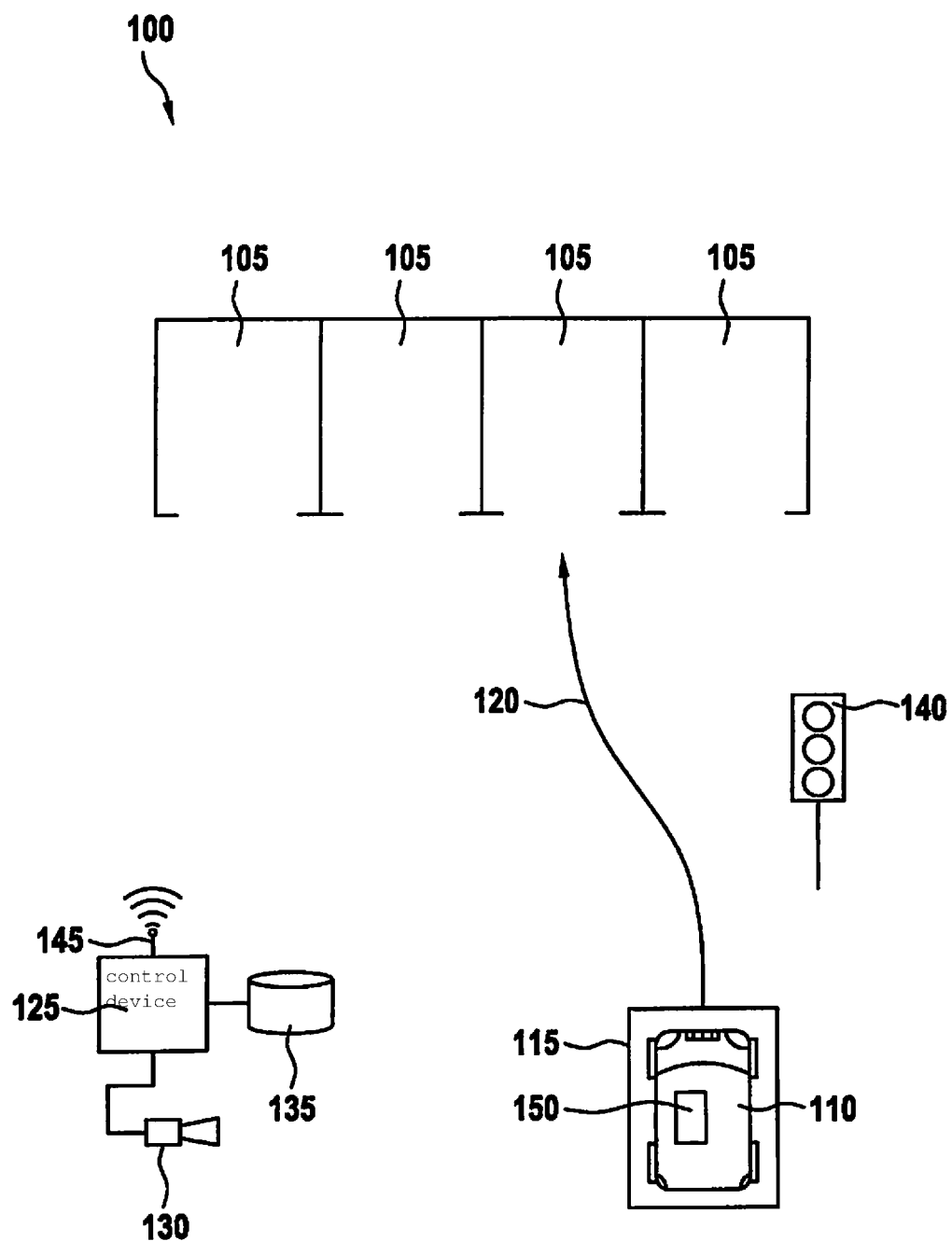
FIG. 1 shows a parking system for automatic valet parking.

FIG. 1 shows a parking system 100 for automatic valet parking (AVP). Parking system 100 includes one or more parking spaces 105 at each of which a motor vehicle 110 can be parked. For this purpose, a driver drives motor vehicle 110 to a drop zone 115 and leaves the motor vehicle 110. Vehicle 110 then drives autonomously on a route 120 to a specified parking space 105. A control device 125 that is included in parking system 100 determines which parking space 105 is intended for motor vehicle 110, and, if warranted, also determines the guiding along route 120. If the driver wishes to use his or her motor vehicle 110 again, then in a corresponding manner the vehicle is driven autonomously from parking space 105 back to drop zone 115, where the driver can take over motor vehicle 110.

A complete AVP parking process can include driving from drop zone 115 to parking space 105, entering the space, and parking motor vehicle 110. In the opposite direction, a complete AVP retrieval process can involve starting motor vehicle 110, leaving the parking space, and driving autonomously to drop zone 115. In a further variant, parking and/or retrieval operations are not carried out completely, but only partially, including in each case autonomous driving of motor vehicle 110.

Various procedures are available for the autonomous driving of motor vehicle 110 on route 120. In a first specific embodiment, motor vehicle 110 is controlled by a control device 135 that is part of parking system 100 and is mounted outside motor vehicle 110. Control device 135 can have a communication device 145 by which it contacts motor vehicle 110. Communication device 140 is preferably wireless and can include Bluetooth, WLAN, or a mobile data radio connection. One or more monitoring devices 130, such as a camera, a photoelectric barrier, a rangefinder, or some other device, can be provided for monitoring motor vehicle 110.

In a second specific embodiment, motor vehicle 110 is driven on the basis of information it receives from control device 135, control device 135 actively supporting the driving process of motor vehicle 110 on route 120. This specific embodiment is also designated "cooperative infrastructure."

In a third specific embodiment, motor vehicle 110 drives exclusively on the basis of prespecified data, such as a position map of parking lot and a position of a parking space 105 that is to be driven to on route 120.

All three specific embodiments are summarized in the present application under the designation "autonomous controlling of the motor vehicle."

In order to ensure smooth operation, it is generally not desirable for a person to be on board the vehicle during autonomous driving of motor vehicle 110. In order to monitor this, a monitoring device 130 can be provided. This device can be provided on board motor vehicle 110 and can include for example a vehicle sensor such as an interior camera or a seat occupancy sensor. Alternatively or in addition, monitoring device 130 can also be mounted outside motor vehicle 110 and can include, for example, a camera in the area of parking system 100, in particular at drop zone 115. A plurality of monitoring devices 130 are also possible, which can be mounted at different locations.

However, if it has been determined that motor vehicle 110 is in the process of, or is about to be, driven in the area of parking system 100 with a person on board, this can also be tolerated under certain circumstances. For example, a technician or administrator can be present in motor vehicle 110 for testing or safety purposes. The transporting of a person can also be permitted in order to increase the confidence of the driver or one of his/her passengers in parking system 100.

In accordance with the present invention, such authorization for the transporting of persons is granted on request, taking into account further conditions if warranted. The request is normally made to control device 125 by a person on board motor vehicle 110. This can be done in particular before parking motor vehicle 110 at drop zone 115. In a specific embodiment, the request can also be made even earlier, for example during a process of reserving a parking space 105. If the request is granted, a corresponding notice can be stored in a memory 135 by control device 125 and the requesting person can be informed of the positive decision.

If an autonomous trip of motor vehicle 110 with a person on board is detected, then, if permission does exist, further actions intended to prevent the unauthorized transporting of persons can be omitted. Otherwise, one or more measures can be taken to ensure the safety of parking system 100, the person on board motor vehicle 110, and motor vehicle 110 itself. The possible actions can include outputting a notice or warning, influencing the control destination of motor vehicle 110, and modifying a control destination of another motor vehicle 110 in the area of parking system 100. In a specific embodiment, the warning notice can be sent directly to an occupant of motor vehicle 110. For this purpose, the warning can be outputted via a component of the motor vehicle, such as an entertainment system, an information system, or a smartphone networked with the motor vehicle. In another specific embodiment, the warning can also be outputted to personnel in order to cause such personnel to suitably take care of the process.

To support one of the actions, an infrastructure element 140 of parking system 100 can be used, including for example a traffic light, a barrier, a traffic guidance system, a loudspeaker system, a light, a blinking light, or another element mounted fixedly or movably in the area of parking system 100. In another specific embodiment, communication device 145 can be set up for direct communication with motor vehicle 110 or with the person in motor vehicle 110. For example, a fixedly installed or mobile device 150, such as a smartphone, can be provided on board motor vehicle 110, and control device 125 can address mobile device 150 via communication device 145.

It is in particular preferred that the permission to transport the person on route 120 can still be requested even if the transporting of the person has already been detected. In this case, the person on board motor vehicle 110 can be contacted to find out whether he or she wishes to make such a request. If this is the case, the request can be processed, and responded to positively or negatively. If the response is positive, further actions can be omitted. If the person does not wish to make a request for permission to be transported, then one of the mentioned actions can be triggered.

When processing a request, it is preferred that the request be responded to negatively, i.e., that permission not be granted, only when the operation of parking system 100 could present a risk to the person. The granting of permission after receipt of the request can be connected in particular to the condition that a traffic situation in the area of parking system 100 has been evaluated and classified as safe. In particular, this can be based on a traffic flow in the overall parking system 100 or on a traffic flow in the area of the motor vehicle 110.

FIG. 2 shows a flow diagram of a procedure 200 for controlling an automated parking operation in parking system 100. Method 200 can be carried out in particular on control device 125.

In an optional step 205, a request is received for permission to transport a person during an autonomous trip of motor vehicle 110 on route 120 between drop zone 115 and a parking space 105. In this case, in a step 210 it can be determined whether the permission is granted. A result of the decision can be forwarded to the requesting party or person, motor vehicle 110, and/or memory 135.

If motor vehicle 110 is on an autonomous trip on route 120 or if the autonomous trip is imminent, then in a step 215 it is determined whether this is a passenger trip. If this is the case, then in a step 220 it is checked whether a corresponding permission exists. If this is the case, or if it was determined in step 215 that this is not a passenger trip, then method 200 can go over to a state 225 from which no further action is carried out with regard to the autonomous driving of motor vehicle 110 on route 120.

If, on the other hand, permission does not exist, then communication between control device 125 and the person in motor vehicle 110 can be established in a step 230. Infrastructure element 140 can be used for this purpose, or, via communication device 145, motor vehicle 110 or device 150 on board motor vehicle 110 can be used. In an optional step 235, it can be clarified whether the person actually wishes to make a request to remain on board during the autonomous driving of motor vehicle 110. In this case, in a step 240, analogous to step 210, it can be determined whether the permission can be granted or whether it has to be denied. If permission is granted, method 200 can go to step 225. Otherwise, in a step 245 one or more actions can be initiated in order to react to the passenger trip.

What is claimed is:

1. A method for controlling an automated parking operation in which a motor vehicle is autonomously controlled on a route between a drop zone and a parking space at a parking facility, the method comprising:
   (a) detecting that a person is on board the motor vehicle during an autonomous driving process;
   (b) determining that permission does not exist for transporting the person on a trip between the drop zone and the parking space;
   (c) carrying out one or more actions based on the determining that the permission does not exist; and
   (d) performing the following steps between steps (b) and (c):
   creating a communication connection between the person while the person is on board the motor vehicle and a control device of the parking facility located remotely from the motor vehicle;
   detecting, by the control device of the parking facility via the communication connection, a request from the person for the granting of permission to execute the trip; and
   rejecting the request by the control device of the parking facility.

2. The method as recited in claim 1, wherein the request is rejected only if a traffic situation in an area of the parking operation is classified as dangerous.

3. The method as recited in claim 1, wherein the one or more actions include a modification of a control destination of the motor vehicle.

4. The method as recited in claim 1, wherein the one or more actions include an outputting of a warning notice.

5. The method as recited in claim 1, wherein the action includes a modification of a control destination of another motor vehicle in the area of the parking operation.

6. The method as recited in claim 1, wherein the motor vehicle is controlled to stop if permission does not exist.

7. The method as recited in claim 1, wherein the route is modified or blocked by an infrastructure component that controls the driving route, if permission does not exist.

8. A non-transitory computer-readable data carrier storing a computer program including program code for controlling an automated parking operation in which a motor vehicle is autonomously controlled on a route between a drop zone and a parking space at a parking facility, the computer program, when executed by a processing device, causing the processing device to perform:
   (a) detecting that a person is on board the motor vehicle during an autonomous driving process;
   (b) determining that permission does not exist for transporting the person on a trip between the drop zone and the parking space;
   (c) carrying out one or more actions based on the determining that the permission does not exist; and
   (d) performing the following steps between steps (b) and (c):
   creating a communication connection between the person while the person is on board the motor vehicle and a control device of the parking facility located remotely from the motor vehicle;

detecting, by the control device of the parking facility via the communication connection, a request from the person for the granting of permission to execute the trip; and rejecting the request by the control device of the parking facility.

9. A system for controlling an automated parking operation, in which a motor vehicle is autonomously controlled on a route between a drop zone and a parking space at a parking facility, the device comprising:
- a control device located at the parking facility and remotely from the motor vehicle;
- a monitoring device for checking whether there is a person situated in the interior of the motor vehicle; and
- a communication device for creating a communication connection between control device and the person while the person is on board the motor vehicle, wherein:
  - the control device of the parking facility detects via the communication connection a request from the person for granting permission for transporting the person on a trip between the drop zone and the parking space,
  - the control device rejects the request and controls one or more actions based on the control device rejecting the request.

* * * * *